United States Patent [19]
Michaud

[11] 3,955,291
[45] May 11, 1976

[54] DEMONSTRATIVE APPARATUS HAVING AIR-CUSHIONED MOVABLE DISKS

[76] Inventor: Eugène Michaud, 840, Pie XII Boulevard, Quebec, Quebec, Canada

[22] Filed: Jan. 9, 1975

[21] Appl. No.: 539,869

[52] U.S. Cl. .............................. 35/19 R; 273/126 A
[51] Int. Cl.² ........................................ G09B 23/10
[58] Field of Search ............ 35/12 C, 13, 19 R, 49; 214/1 BE; 273/85 H, 126 R, 126 A, 128 R; 346/76 R, 74 S, 74 R

[56] References Cited
UNITED STATES PATENTS

| | | | |
|---|---|---|---|
| 1,848,862 | 3/1932 | Young | 346/74 R |
| 2,596,446 | 5/1952 | Stamper | 346/74 S |
| 2,938,590 | 5/1960 | Barnett | 214/1 BE X |
| 3,650,048 | 3/1972 | Michaud | 35/19 R |

OTHER PUBLICATIONS

*Ealing, 1969, Science Teaching Catalog,* The Ealing Corporation, 1969, pp. 10, 11, 16, 17, 54 and 55.

*Primary Examiner*—Richard C. Pinkham
*Assistant Examiner*—Vance Y. Hum
*Attorney, Agent, or Firm*—Raymond A. Robic; Arthur Schwartz

[57] ABSTRACT

Demonstrative apparatus of the type having a table with one or more air cushioned disks movable on the table and with apparatus for providing a record of the disk movement. The apparatus comprise a spark generator connected to the disk for generating sparks from the disk toward the table. In accordance with the present invention, the table is preferably made from insulating material. A sheet of conducting and marking material, such as colloidal carbon paper, is placed on the table beneath the disk. A sheet of plain marking paper is then placed on the colloidal carbon paper to visibly record the track of the disk as it moves over the table and as sparks are generated.

11 Claims, 6 Drawing Figures

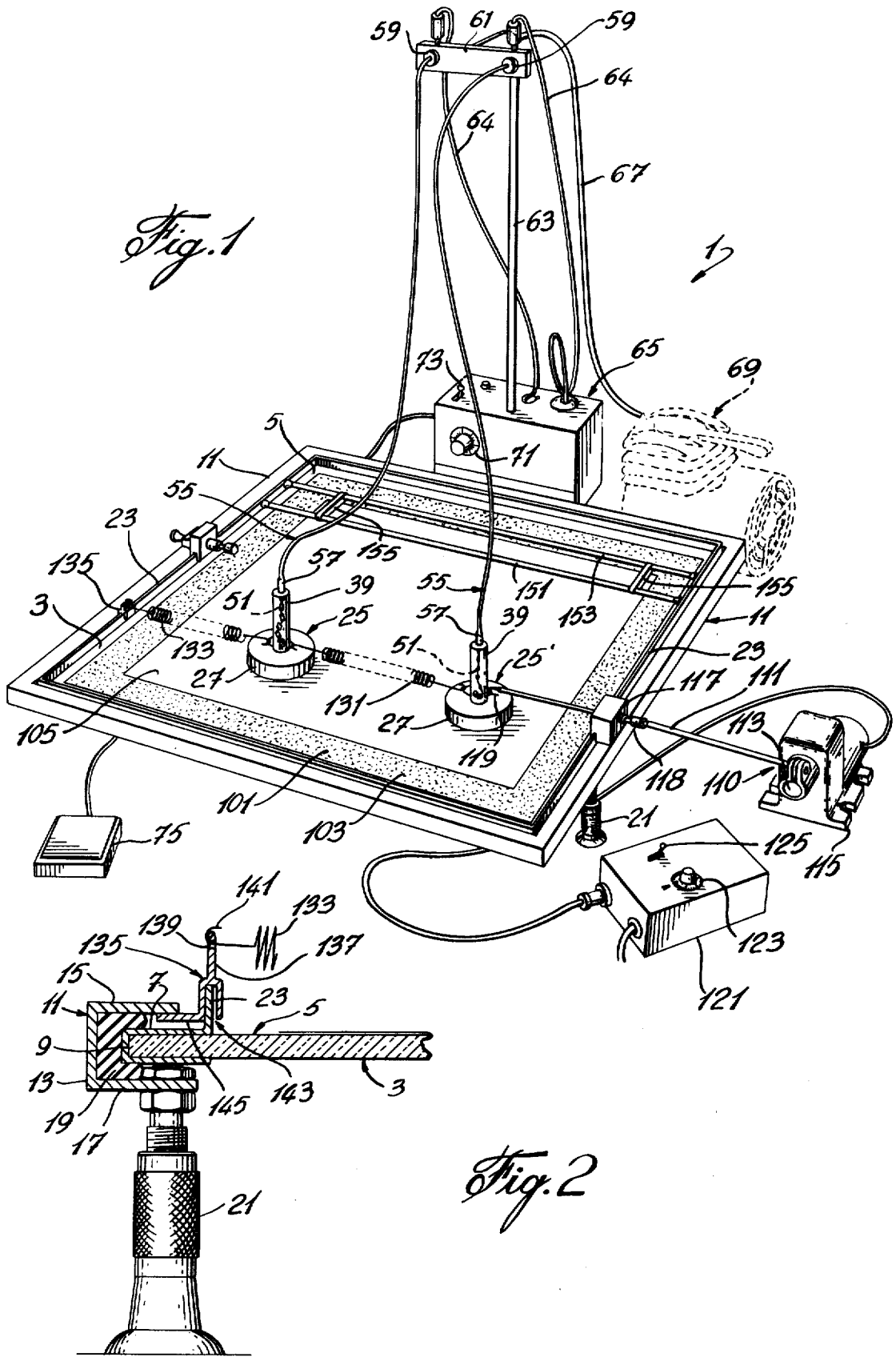

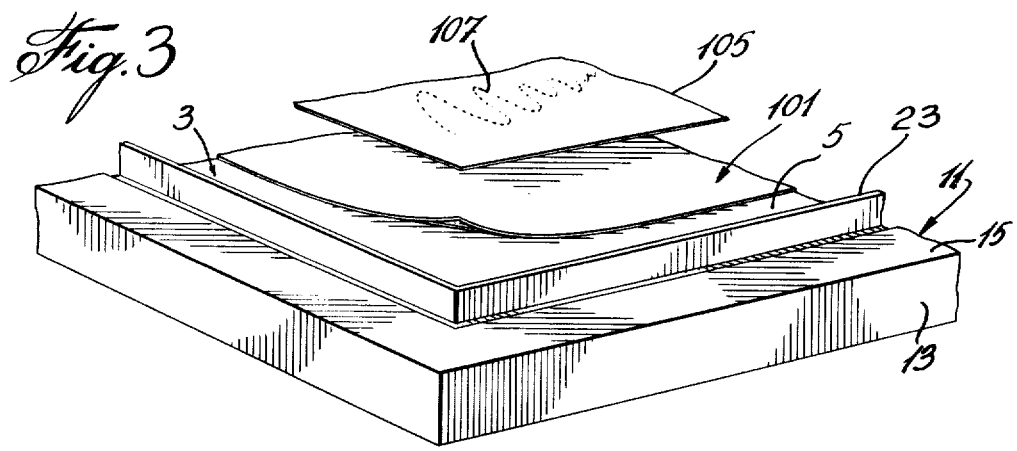
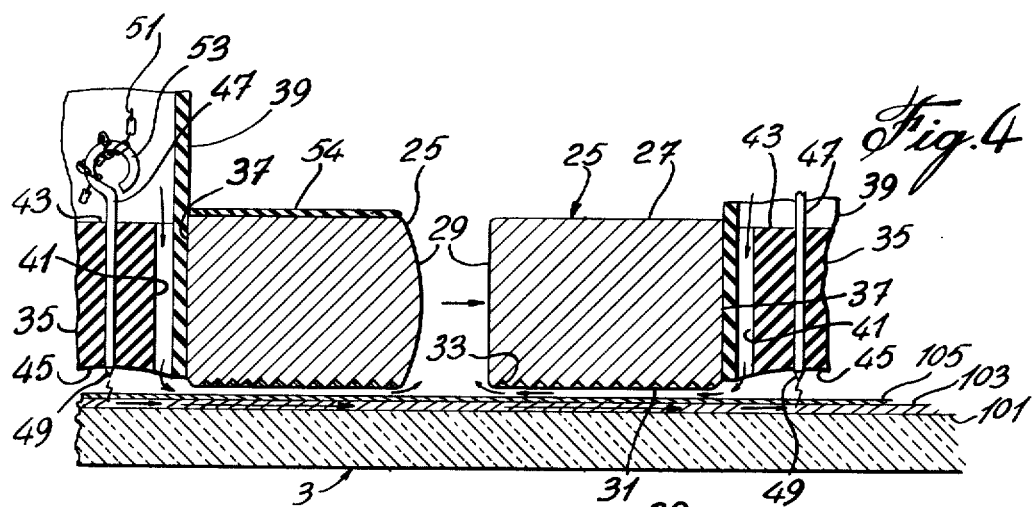
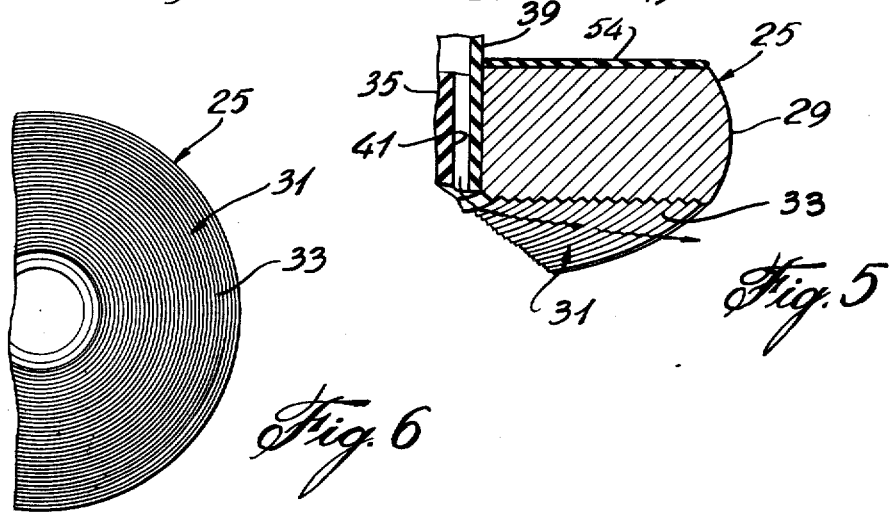

DEMONSTRATIVE APPARATUS HAVING AIR-CUSHIONED MOVABLE DISKS

This invention is directed toward improvements in demonstrative apparatus, and particularly apparatus for demonstrating physical, and specifically motion, laws.

The improved demonstrative apparatus is of the type employing a table with one or two air cushioned disks movable over the surface of the table and with means for mapping the direction and speed of the moving disks.

Demonstrative apparatus of the above type is known. My own U.S. Pat. No. 3,650,048, issued Mar. 21, 1972, illustrates such apparatus employing unique means for marking the direction of movement of, and the speed of, one or two air-cushioned disks moving the surface of the table. This apparatus works very well and is relatively inexpensive both to purchase and to operate.

The known apparatus has some disadvantages however. A special paper is required with the apparatus to mark the path of the disk in moving over the table. In addition, the apparatus must be carefully used to avoid electrical shock since it requires the use of a metal table which receives an electrical charge.

It is therefore a purpose of the present invention to provide a demonstrative apparatus which is cheaper and safer than known apparatus to operate.

It is more particularly the purpose of the present invention to provide an improved demonstrative apparatus which can be used with ordinary paper, as opposed to special paper, to mark the path of movement of a disk to the table.

It is another purpose of the present invention to provide an improved demonstrative apparatus which reduces the danger of electric shocks.

It is another purpose of the present invention to provide disks which have improved operation on the table.

It is still another purpose of the present invention to provide demonstrative apparatus with optional features providing greater scope and variation in the demonstrations. It incorporates the spark timer to reduce possibility of shock hazard.

The invention is particularly directed toward demonstrative apparatus having an electrically insulative surface and at least one disk movable on the surface. Means are provided for cushioning the disk by air on the surface, and means are connected to upper part of the disk for generating sparks from the disk toward the surface.

The apparatus includes a sheet having conductive and marking material thereon which sheet is positioned between the plain paper surface and the table.

A second sheet of paper is positioned on the first sheet beneath the disk to visibly show the path of the disk as it moves and as sparks are generated.

The invention will now be described in detail having reference to the accompanying drawings in which:

FIG. 1 is a perspective view of the demonstrative apparatus according to the present invention;

FIG. 2 is a detail cross-sectional view of the frame showing the mounting of the table;

FIG. 3 is a perspective detail view of the table;

FIG. 4 is a detail cross-sectional view of the disks and table;

FIG. 5 is a detail cross-sectional view of a disk; and

FIG. 6 is a bottom plan of a disk.

The improved demonstrative apparatus 1 of the present invention has a table 3 providing a top work surface 5. In accordance with the present invention the table is preferably made of non-conducting insulative material such as, for example, glass. The table 3 has a mounting channel 7 extending about its peripheral edge 9 as shown in FIG. 2. The channel 9 is mounted within a frame 11 which extends about the edge 9 of the table 3. The frame 11 comprises a U-shaped channel with the base 13 of the channel forming the outer, vertical wall of the frame. The mounting channel 7 is mounted within the U-shaped frame 11 spaced from its base 13 and top and bottom walls 15, 17 by a resilient spacer member 19. The spacer member can be made of rubber or other suitable material.

The frame 11, and this table 3, is supported by legs 21 attached to bottom wall 17 of the frame as shown in FIG. 2. The legs 21 are vertically adjustable so that the table 3 can be levelled.

A vertical retaining wall 23 is provided on table 3 extending about its periphery. The wall 23 is attached to the top of the mounting channel 7. The wall 23 acts to retain one or more disks 25 on the work surface 5 of the table.

Each disk 25, as shown in FIGS. 4, 5 and 6 comprises an annular ring 27 made of heavy material such as steel for example. The outer peripheral edge 29 of at least one of the rings 27 is convexly rounded. The rounded edge 29 provides for sharper, more distinct contact between the disks when they collide on the table. The bottom surface 31 of each ring preferably is covered with a plurality of concentric V-shaped grooves 33, or a spiral V-shaped groove.

A plug 35 is mounted in the central hole 37 of the ring, within a flexible hollow case 39 which extends out above the ring 27. The plug 35 has a plurality of through holes 41 extending between its top and bottom surfaces 43, 45. An electrical conducting pin 47 extends through the plug 35. The bottom or tip 49 of the pin, projecting past bottom surface 45, is pointed. The tip 49 is however located slightly above bottom surface 31 of the disk. To provide this clearance, the bottom face 45 of plug 35 can be made concave as shown in FIG. 4. An electrical conducting chain 51 is attached to the top 53 of the pin 47. The top of the disks 25 could be covered with a layer of insulating material 54 such as plastic for example.

A hollow flexible tube 55 is mounted, at one end 57, to the top of core 39 as shown in FIG. 1, on each disk 25. The other end 59 of tube 55 is mounted to a distributing bracket 61 on a vertical stand 63. Within bracket 61, the end of chain 51 which extends from pin 47 through tube 55 is connected to an electrical cable 64 which runs to a spark generator 65 attached to one side of the frame 11. Also within bracket 61, tube 55 is connected to a line 67 running to a compressor 69.

The spark generator 65 is constructed to provide a plurality of timed electrical pulses to the tip 49 of pin 47 via cable 64 and chain 51. Preferably, the generator 65 is provided with adjustable control means 71 so that one of several different timing scales can be selected depending on the nature of the experiment. Preferably, pulses can be provided every 100, 50, 40, 30, 20 and 10 milliseconds depending on which is selected by control means 71. The generator 65 has an on-off switch 73 and its operation is controlled by a foot switch 75, allowing the operator the use of both hands during any experiment.

In operation, a sheet 101 having conductive and marking material thereon is placed on the work surface 5. This sheet preferably comprises carbon paper, which is placed with the carbon side 103 up, on the work surface 5 of the table 3. A sheet 105 of marking paper is placed on the carbon side 103 and one or both disks 25 are placed on the paper 105 depending on the nature of the experiment to be demonstrated. Compressor 69 is operated to pump air, under a pressure of 3 to 5 pounds, through line 67 to distributing bracket 61, tubes 55, core 39, and holes 41. The air passes from holes 41 centrally beneath bottom surface 31 of the disk to outer edge 29 thus supporting the disk on a cushion of air. The concentric or spiral grooves 33, being transverse to the radial flow of air, ensure a more uniform, thicker air cushion for the disk, by slowing up the air flow.

The spark generator 65, having been previously turned on with switch 73 and set by control means 71 to provide the desired spark timing, is actuated by foot control switch 75 to produce sparks from the tip 49 of pin 47 via chain 51 and cable 63. The sparks penetrate marking paper 105 in passing to conductive carbon paper 101 which grounds the spark. As the sparks hit carbon paper 101, carbon particles are, in effect, exploded off the paper 101 transferring the marking paper 105 to outline the spark hole. The disk 25 is moving at this stage over the marking paper 105 an a cushion of air in a certain path 107 and the sparks, every 100, 50, 40, 30, 20 or 10 milliseconds apart, leave a carbon accentuated visible trail of this path on the paper as shown in FIG. 3. Knowing the timing of the sparks, the distance between the spark holes can be easily measured on the marking paper to give a ready velocity reading of the disk.

The carbon paper 101 can be used with many marking sheets 105 before a fresh sheet is required. While the use of the carbon paper has been described in connection with an insulative plate member, it can be used as well without such a member.

The apparatus can be provided with oscillating means 110, as shown in FIG. 1, for use in conducting certain types of experiments. The oscillating means 110 includes a rod 111 one end of which is mounted eccentrically on a shaft 113 of a motor 115. The rod 111 can extend through a mounting bracket 117 mounted on frame 11, and adjacent wall 23, via a universal joint 118. The free and of the rod 111 extends over table 3 and has a hook 119 by which it attaches to a loop on one of the disks 25'. The motor 115 is operated electrically by a control 121 which includes a motor speed control 123 and an on-off switch 125. The rod 111, being eccentrically mounted moves to an fro imparting to an fro movement to the attached disk 25'. The speed of the to and fro movement is regulated by motor speed control means 123.

This to and fro movement can be transmitted, via a connecting spring 131 to the second disk 25 which is mounted via a second spring 133 to a bracket 135 on wall 23 opposite bracket 117. Bracket 135, as shown in FIG. 2 has an upstanding arm 137 with a hole 139 therein for receiving a hook 141 on spring 133. The bracket 135 has a slot 143 below arm 137 for receiving wall 23. A lateral arm 145 extends out from bracket 135 for passing under top wall 15 of frame 11. Lateral arm 145 abuts against top wall 15 thereby counteracting force of spring 133 which tends to pull bracket 135 of wall 23.

If desired, a pair of parallel guide rods 151, 153 can be provided, spaced apart by spacers 155 a distance just slightly greater than the diameter of disks 25. The rods 151, 153 can be positioned on the table 3 to extend between opposed retainer walls 23 as shown in FIG. 1 and serve to guide one or both disks 25, 25' between them in straight line motion. Sinusoidal motion can be shown on a marking sheet by setting up the disk or disks in straight line motion between the rods 151, 153 while simultaneously withdrawing the sheet 105 in a transverse direction from beneath the rods 151, 153 and disks 25, 25' held between the bars.

I claim:

1. In a demonstrative apparatus, particularly for use in demonstrating physical laws having a table, at least one movable substantially annular disk on the table, means for producing a substantially uniform cushion of air between the table and the disk to cause floating of the disk above the surface of the table, a spark generator electrically connected to the disk, means in the disk for transmitting sparks produced by the spark generator to a ground surface, and means between the ground and the disk to record the sparks when the disk is moved, the improvement comprising:
 a. the table having an insulative surface,
 b. the disk having a bottom surface including a plurality of concentric annular grooves,
 c. the ground surface being in the form of a first thin sheet of conductive, permanent marking material positioned on the insulative surface between the disk and the insulative surface,
 d. a second sheet of plain paper positioned between the bottom of the disk and the sheet of conductive, permanent marking material whereby a permanent graph is left on the plain paper showing the path of movement of the disk.

2. Apparatus as claimed in claim 1, wherein the insulative surface is hard and flat.

3. Apparatus as claimed in claim 1, wherein the first sheet is colloidal carbon paper.

4. Apparatus as claimed in claim 1, including means for generating sparks at one of several differently timed cycles.

5. Apparatus as claimed in claim 4, including foot operated switch means for controlling operation of the spark generating means.

6. Apparatus as claimed in claim 1, wherein the outer edge of one of the annular disk is convexly curved, and the other disk is flat.

7. Apparatus as claimed in claim 1, including oscillating means attached to the disk for moving the disk to and fro on the surface.

8. Apparatus as claimed in claim 1, including a retaining wall extending about the periphery of the insulative surface, and a frame surrounding the retaining wall and insulative surface.

9. Apparatus as claimed in claim 8, including a spring bracket having means for mounting it on the wall and means for cooperating with the frame to hold it on the wall.

10. Apparatus as claimed in claim 8, including oscillator means, the oscillator means having a motor, a drive shaft, a rod eccentrically attached at one end to the drive shaft, a bracket mounted on the wall and frame for holding the rod, and means on the other end of the rod for attaching it to a disk.

11. Apparatus as claimed in claim 8, including a pair of parallel guide members, fixedly spaced apart a distance slightly greater than the width of the disk, and means for detachably mounting the members on the surface between opposed retaining wall portions.

* * * * *